US006587652B2

(12) United States Patent
Metzler

(10) Patent No.: US 6,587,652 B2
(45) Date of Patent: Jul. 1, 2003

(54) ADJUSTING DEVICES AND METHOD TAKING SUBSTRATE CHANGES INTO ACCOUNT FOR GENERATING COLOR SEPARATIONS IN A MULTICOLOR PRINTING MACHINE

(75) Inventor: Patrick Metzler, Gettorf (DE)

(73) Assignee: NexPress Solutions LLC, Rochester, NY (US)

( * ) Notice: Subject to any disclaimer, the term of this patent is extended or adjusted under 35 U.S.C. 154(b) by 0 days.

(21) Appl. No.: 09/929,623

(22) Filed: Aug. 14, 2001

(65) Prior Publication Data

US 2002/0039495 A1 Apr. 4, 2002

(30) Foreign Application Priority Data

Aug. 18, 2000 (DE) ........................................ 100 40 368

(51) Int. Cl.[7] ........................ G03G 15/00; G03G 15/01; G01D 15/06

(52) U.S. Cl. ......................................... 399/45; 347/115

(58) Field of Search .......................... 399/45, 297, 298; 347/115, 116; 356/429

(56) References Cited

U.S. PATENT DOCUMENTS 4,965,597 A 10/1990 Ohigashi et al. ............ 347/118
5,093,674 A * 3/1992 Storlie ........................ 347/116
5,689,757 A 11/1997 Ferrante et al. ............... 399/45
5,729,349 A * 3/1998 Tomita et al. .............. 356/429
5,991,588 A * 11/1999 Kraft .......................... 399/297

FOREIGN PATENT DOCUMENTS

DE 43 37 094 A1 4/1995
EP 0 469 282 A2 2/1992
EP 0 902 332 A1 3/1999
EP 0 905 574 A2 3/1999
JP 5-327948 * 12/1993
JP 8-110308 * 4/1996

OTHER PUBLICATIONS

JP 10143020 A., In: Patent Abstracts of Japan.

* cited by examiner

*Primary Examiner*—Fred L. Braun
(74) *Attorney, Agent, or Firm*—Lawrence P. Kessler

(57) ABSTRACT

A method and an apparatus for adjusting devices (1, 1') for generating color separations (2, 2') in a multicolor printing machine (3), changes in the dimensions (4, 4', 5, 5') of printing substrates (6) being taken into account by controlling the image generation. Changes in the dimensions (4, 4', 5, 5') of printing substrates (6) during or after printing are to be taken into account as early as during the image generation. The fiber orientation (7) of printing substrates (6) is registered and, on the basis of the fiber orientation (7) and values from experience (8, 8', 10, 10', 10") of the behavior of printing substrates (6) depending on the fiber orientation (7), control being carried out before the start of printing.

25 Claims, 2 Drawing Sheets

ADJUSTING DEVICES AND METHOD TAKING SUBSTRATE CHANGES INTO ACCOUNT FOR GENERATING COLOR SEPARATIONS IN A MULTICOLOR PRINTING MACHINE

FIELD OF THE INVENTION

The invention relates to adjusting for generating color separations in a multicolor printing machine, changes in the dimensions of printing substrates being taken into account by controlling the image generation.

BACKGROUND OF THE INVENTION

EP 0 469 282 A2 discloses a method and an apparatus for adjusting generating color separations in a multicolor printing machine. It is used for the mutual coordination of color separations which are fused with the paper, that is to say joined to the paper by melting, separately, in such a way that the next color separation always fits with accurate register onto the color separation or separations already fused. To this end, each printed and fused color separation is measured, and the changes in the dimensions are taken into account for the accurate-register application of the next color separation.

Although control systems are also known which previously register parameters that act on the register and take them into account when controlling the image generation, such as that from U.S. Pat. No. 5,689,757, the teaching there is to take into account the influence of the roughness of the paper on the register when feeding in printing substrates of a different grade. To this end, the roughness of the paper, which is to be printed, is measured. The influence of the paper roughness on the register is then taken into account by the register control before the paper is fed into the printing process. However, a dimensional change in a printing substrate, in particular a paper, because of its anisotropic behavior cannot be taken into account in a corresponding manner.

SUMMARY OF THE INVENTION

The invention concerns taking account of changes in the dimensions during printing or after printing as early as before printing when controlling the image generation.

The invention is therefore based on the object of taking into account changes in the dimensions of printing substrates during or after printing as early as during the image generation.

The object is achieved by the fiber orientation of printing substrates being registered and, on the basis of the fiber orientation and values from experience of the behavior of printing substrates depending on the fiber orientation, the control is carried out before the start of printing.

Further, the object is achieved by a sensor for registering the fiber orientation being arranged upstream of the first printing unit, by a store being provided to accommodate values from experience of the behavior of printing substrates depending on the fiber orientation, and by the control device to adjust the devices for producing color separations on the basis of the values from experience before the start of printing and being connected to the sensor and store for the purpose of data transmission.

The invention makes it possible, by associating values from experience with the directions which characterize an anisotropic behavior of a printing material, to take into account correction values as early as during the image generation, with the objective that the prints applied shall have an absolute or relative desired value after a change in the dimensions of the printing material. In this case, the dimensional changes of printing material and print are virtually identical, since there is a difference between these dimensions only in a print-free margin. The invention relates to the processing of all printing materials which have a fiber orientation and therefore exhibit different dimensional changes resulting from different conditions, in particular shrinkage under the influence of ink absorption, absorption of moisture, drying, temperature changes and so on. As a rule, these are printing materials such as paper and paperboard. These generally exhibit a higher shrinkage in the fiber direction than transversely to the latter.

The prior control of the image generation according to the invention is particularly advantageous when multicolor printing machines with digital image generation produce a different printed image during each image generation operation, since in this case proofs are not possible. The same applies to the production of small editions of identical prints.

Developments of the invention provide for the storage and call-up of various values from experience for the control of the image generation. For example, provision can be made for values from experience for various paper grades to be stored, and the relevant values from experience to be taken into account. For this purpose, with respect to the apparatus, provision is made for the store to be loaded with values from experience for various paper grades. The paper grade used can be input with the print job or separately or registered by a sensor.

An alternative configuration provides for at least one paper property to be registered, the values from experience for the at least one paper property to be stored and for the relevant values from experience to be taken into account. In this way, values from experience for various paper thicknesses (calipers) or for various paper weights (grammages) can be provided. The apparatus for implementing the method then provides for at least one sensor to register paper properties, for the store to be loaded with values from experience for various paper properties, and for the control device to be connected to the at least one sensor for the purpose of data transmission. Here, it may be, for example, a sensor for registering the paper thickness or a sensor for registering the paper weight. Of course, it is also possible, however, to input the values from experience for the corresponding paper property with the print job or by hand.

Alternatively or preferably additionally, provision can be made for at least one condition causing the changes in the dimensions of printing substrates to be registered and for values from experience associated with this condition to be taken into account in the control. Examples of such conditions are the atmospheric humidity and the temperature, and further conditions, such as the amount of toner applied, can of course likewise be taken into account. With respect to the apparatus, to this end, provision is made for at least one sensor to register at least one condition that causes the change in the dimensions of printing substrates, for the store to be loaded with values from experience for the at least one condition, and for the control device to be connected to the at least one sensor for the purpose of data transmission. The sensor may be a sensor for registering the atmospheric humidity, a temperature sensor or another sensor. It is possible to take account both of conditions within the printing process and also conditions, which occur after the printing process. This ultimately depends on the objective of the control. Of course, however, values from experience or the conditions, which are associated with stored values from experience, could also be input by hand.

The objectives of the control can be that absolutely predefined dimensions are to be achieved by means of the measure according to the invention, or that relative relationships are to be achieved. For example, provision can be made for the control to be used to achieve predefined dimensions of the prints in the end product. To this end, a control device is such that it takes into account changes in the dimensions in such a way that predefined dimensions can be achieved in the finished prints.

If printing substrates are to be printed on both sides, then the control can also be used to coordinate the dimensions of recto and verso print with one another. The control device is then such that it takes into account the changes in the dimensions in such a way that the dimensions of recto and verso print are coordinated with one another.

However, the invention may also be used in such a way that the control is used to coordinate the dimensions of the prints of the various color separations with one another. The control device is then such that it takes into account the changes in the dimensions in such a way that the dimensions of the prints of the various color separations are coordinated with one another.

As already mentioned, it is also possible for values from experience of conditions which bring about a change in dimensions of printing substrates after printing to be taken into account. Such conditions can be, for example, that the printing substrates heated by the fuser cool down to room temperature, or that they absorb atmospheric humidity or that a drying process takes place. However, the values from experience can also be dimensional changes resulting from further processing, for example as a result of the application of a varnish layer. With respect to the apparatus, provision is then made for the store to be loaded with values from experience which relate to conditions which act on a printing substrate after the printing, and for the control device to be such that it takes into account the values from experience when controlling the image generation in order to achieve predetermined dimensions.

BRIEF DESCRIPTION OF THE DRAWINGS

The invention will be explained below by using the drawing, in which.

DETAILED DESCRIPTION OF THE INVENTION

Figure 1:
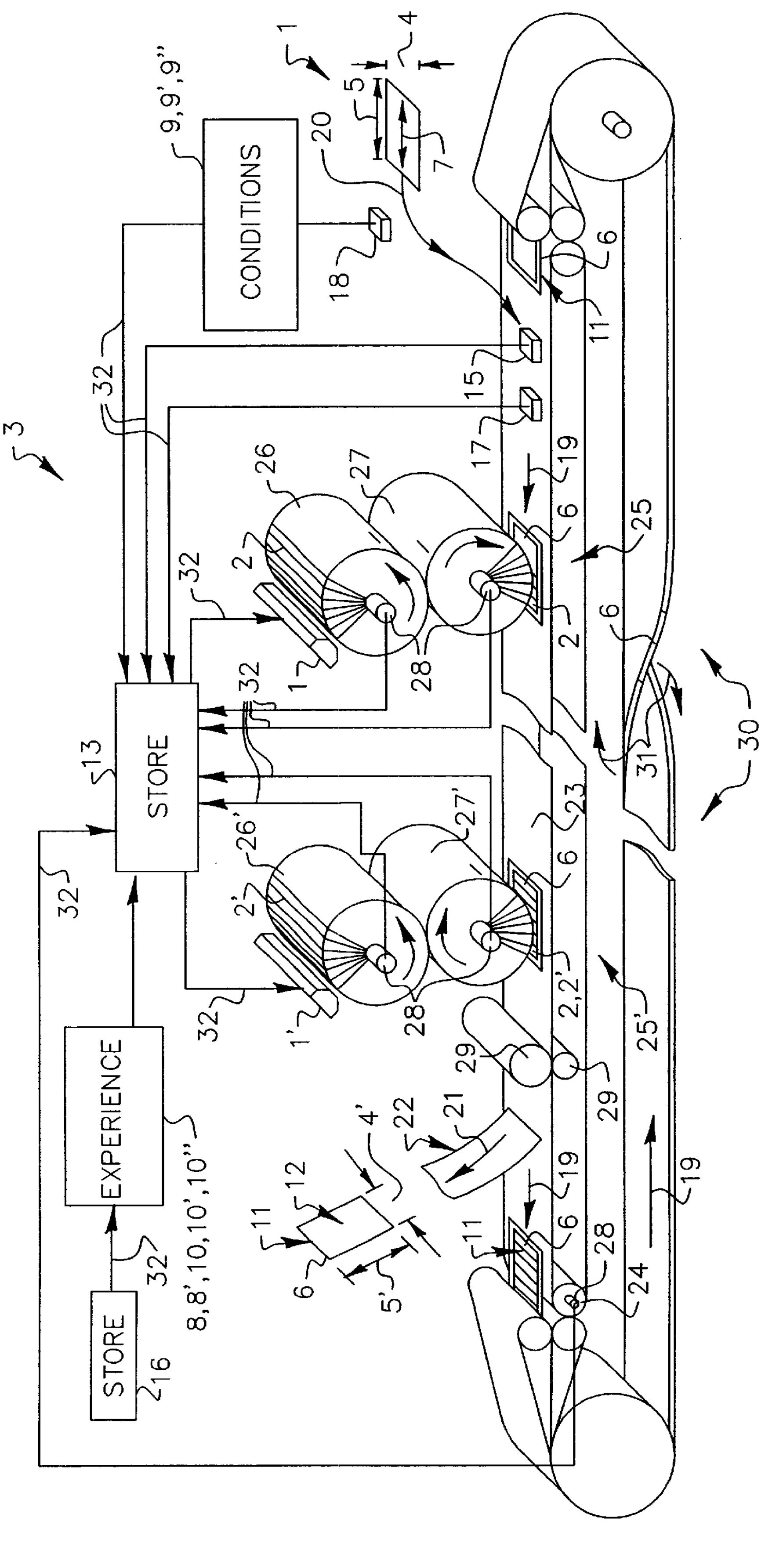
FIG. 1 shows a basic illustration of a multicolor printing machine with an apparatus according to the invention.

FIG. 1 shows a basic illustration of a multicolor printing machine 3, which has a plurality of printing units 25, 25', each of which has a device 1, 1' for generating color separations 2, 2'. The multicolor printing machine 3 is supplied with printing substrates 6, which before the start of printing, has a dimension 4 in the direction of the fiber orientation 7 and a dimension 5 transversely with respect to the direction of the fiber orientation 7. The supply of the printing substrate 6 is illustrated symbolically by an arrow 20, the printing substrate 6 then being transported in the direction of the arrow 19 by means of a transport belt 23. The printing substrate 6 passes through all the printing units 25, 25', a color separation 2, 2' being generated on an image cylinder 26, 26' in a digital manner on each of these printing units by a device 1, 1', said color separation then being transferred to an image cylinder 27, 27' and from there being applied to a printing substrate 6. These color separations 2, 2', either individually or altogether, are permanently connected to the paper after their application by being melted on by a fuser device 29. The printing substrate 6 can then be routed away directly or by a diverter 22 in the direction of the arrow 21, or it is possible for it to be supplied to a turner device 30, which turns the printing substrate 6 in the direction of the arrows 31, in order then to supply it to the multicolor printing machine 3 again and likewise to print on the back.

The accurate-register application of the color separations 2, 2' to the printing substrates 6 is served by a control device 13, which controls the devices 1, 1' for generating the color separations 2, 2'. For this purpose, the printing substrates 6 are registered by a sensor (not illustrated) as they are supplied to the multicolor printing machine 3, and the positions of the image cylinders 26, 26', of the image transfer cylinders 27, 27' and also of the transport belt 23 are registered. In order to register position in this way, angular position transmitters 28 can be used, the position of the transport belt 23 being registered by an angular position transmitter 28 on a roller 24. The registered data are transmitted by data transmitter 32 to the control device 13, which calculates the in-register generation of the color separations 2, 2' and transmits this data in turn via data transmitter 32 to the devices 1, 1' for generating the color separations 2, 2'.

Figure 2:
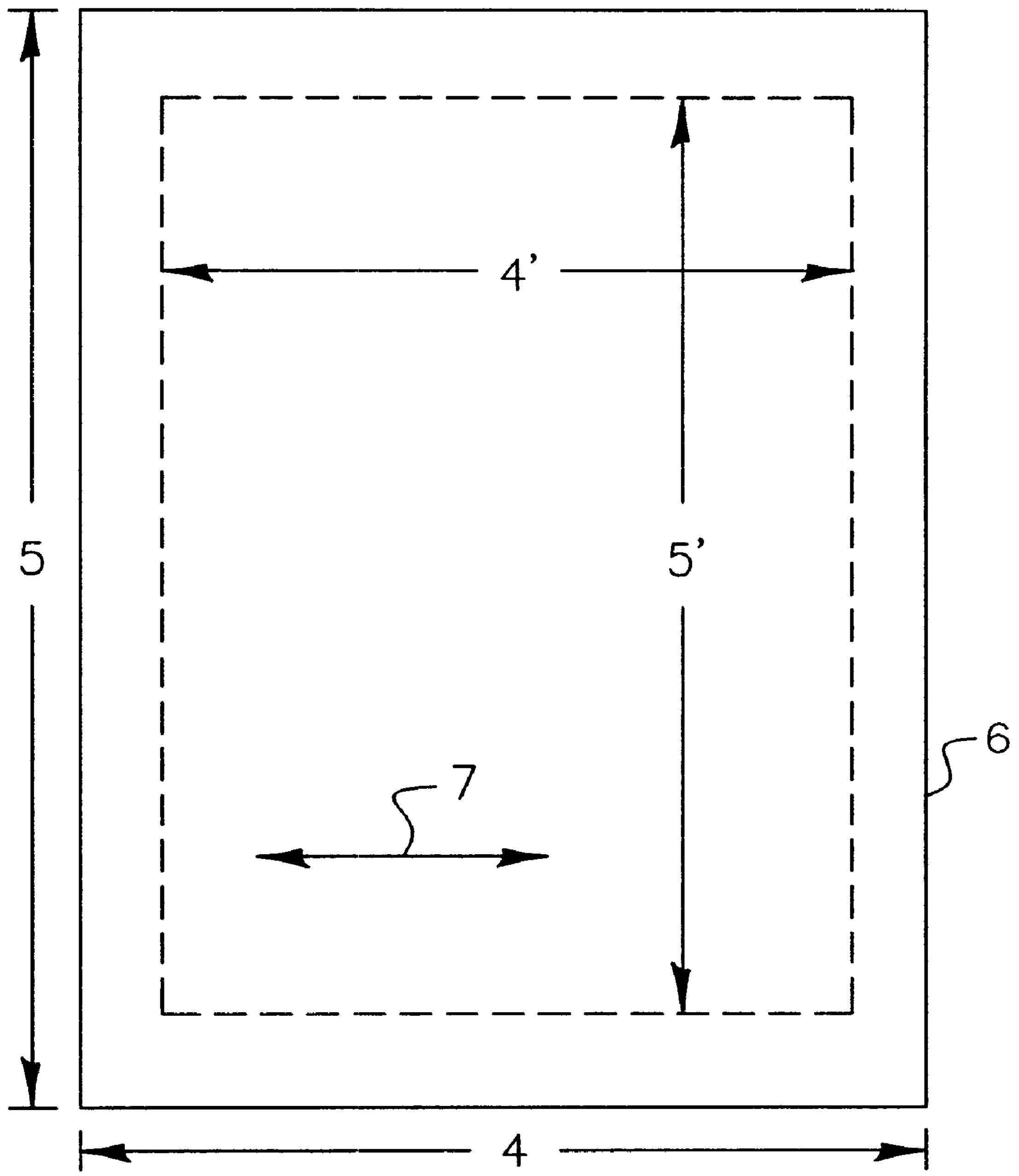
FIG. 2 shows an illustration of dimensional changes of a printing substrate.

During printing, the problem arises that the dimensions 4 and 5 of a printing substrate 6 are not maintained. This is shown in FIG. 2. Because of the action of heat, ink, moisture or pressure during printing, a change in the dimensions 4 and 5 occurs, for example in the form of shrinkage, which is illustrated in exaggerated form by the changed dimensions 4' and 5'. However, the additional problem occurs that these dimensional changes 4, 4', 5, 5' are anisotropic. As a rule, more severe shrinkage occurs in the direction of the double arrow 7 representing the fiber orientation than transversely with respect to this fiber orientation 7. If, therefore, such a behavior of a printing substrate 6 under the aforementioned actions is to be taken into account when generating color separations 2, 2', then it is necessary to include the fiber orientation 7 in the calculations.

Since, during the production of printing substrates 6, the fiber orientation 7 is not always oriented in the same way, the invention provides a sensor 15 for registering the fiber orientation 7, this sensor 15 being connected by a data transmitter 32 to the control device 13. The control 13 is in turn connected to a store 16, which contains values from experience 8, 8', 10, 10', 10", which can be associated with various dimensional changes 4, 4', 5, 5' of printing substrates 6. For example, values from experience 8 based on various paper grades may be contained. Then, before the start of printing, it is necessary to input the paper grade, which is associated with the corresponding value from experience 8, so that the control device 13 can already include this behavior when generating the color separations 2, 2'. A dimensional change 4, 4', 5, 5' of this type can be included in the calculation in the image generation by a value from experience 8 in such a way that a fixedly defined dimension 4' and 5' of the end product is ultimately achieved, or it is possible for dimensional changes 4, 4', 5, 5' to be taken into account during the printing process, in order to achieve agreement between relative dimensions during the further production. For example, it is possible to take into account a dimensional change 4, 4', 5, 5' at each printing unit 25, 25', in order to adjust each color separation 2 to the next color separation 2' and so on. However, it is also possible to coordinate a recto print 11 printed first with a verso print 12 which arrives on the back of the printing substrate 6.

Apart from the values from experience 8 for various paper grades, it is of course possible for a great number of further values from experience 8', 10, 10', 10" and so on to be taken into account as well. For example, it is possible to associate values from experience 8' with various paper properties, it being possible then for these paper properties to be input, or advantageously for a sensor 17 for registering paper properties to be provided, which registers this data and transmits it by a data transmitter 32 to the control device 13, so that the latter can select the values from experience 8' from the memory 16. Such values from experience 8' are, for example, the thickness of the paper or the paper weight.

In addition to taking into account the behavior of various paper grades or papers with various properties, it is of course also possible for further conditions 9, 9', 9", to be used to select values from experience 10, 10', 10". Such conditions 9, 9', 9" do not relate to printing substrates 6 but to external effects which lead to dimensional changes 4, 4', 5, 5' in printing substrates 6. Such conditions are, for example, the atmospheric humidity 9' or the temperature 9". In this case, the atmospheric humidity 9' or the temperature 9" can change during each production step in a print and can therefore continually assume new values. Depending on whether such conditions 9, 9', 9" are to be taken into account once or repeatedly as a printing substrate 6 passes through the multicolor printing machine 3, it is necessary to provide one sensor 18 or a plurality of such sensors for registering the conditions 9, 9', 9". Depending on these conditions 9, 9', 9", values from experience 10, 10', 10" are contained in the store 13, for example values from experience 10' for atmospheric humidities or values from experience 10" for temperatures. The control device 13 can take into account the values from experience 8, 8', 10, 10', 10" individually or in combination, and can take them into account to the end that absolute dimensions or relative dimensions are maintained in the form already mentioned or are brought into agreement.

Of course, the invention is not restricted to the multicolor printing machine 3 illustrated, but can be employed in any desired printing machines, it being possible for the multicolor printing machines 3 to have an extremely wide range of configurations. It is possible for the color separations 2, 2' to be transferred directly from the image cylinders 26, 26' to the printing substrates 6 or for the color separations 2, 2' to be applied to a cylinder and transferred from the latter, directly or indirectly, to the printing substrates 6. Of course, the measure according to the invention can also be used in a single-color printing machine, but this will generally not be the case because of the lower requirements on such prints. Sensors 15 for registering the fiber orientation-are known and can, for example, be ultrasonic sensors. In addition, the other sensors 17 and 18 can be an extremely wide range, depending on what is to be registered.

PARTS LIST

| | |
|---|---|
| 1, 1' | Devices for generating color separations |
| 2, 2' | Color separations |
| 3 | Multicolor printing machine |
| 4, 4', 5, 5' | Dimensions of printing substrates |
| 4 | Dimension in the direction of the fiber orientation before the start of printing |
| 4' | Changed dimension 4 |
| 5 | Dimension transverse to the direction of the fiber orientation before the start of printing |
| 5' | Changed dimension 5 |
| 6 | Printing substrate |
| 7 | Double arrow: Fiber orientation |
| 8, 8' | Values from experience |
| 8 | Values from experience based on different paper grades |
| 8' | Values from experience based on different paper properties |
| 9, 9', 9" | Conditions which cause changes in the dimensions of printing substrates |
| 9' | Atmospheric humidity |
| 9" | Temperature |
| 10, 10', 10" | Values from experience which are associated with the conditions 9 |
| 10' | Values from experience for atmospheric humidities |
| 10" | Values from experience for temperatures |
| 11 | Recto print |
| 12 | Verso print |
| 13 | Control device |
| 14, 14' | Printing units |
| 14 | First printing unit |
| 15 | Sensor for registering the fiber orientation |
| 16 | Store |
| 17 | Sensor for registering paper properties |
| 18 | Sensor for registering a condition causing the change in dimensions of the printing substrate |
| 19 | Arrow: Direction of the transport of printing substrates |
| 20 | Arrow: Supply of printing substrate |
| 21 | Arrow: Routing printing substrates away |
| 22 | Diverter |
| 23 | Transport belt |
| 24 | Roller belonging to the transport belt |
| 25, 25' | Printing units |
| 26, 26' | Image cylinders |
| 27, 27' | Image transfer cylinders |
| 28 | Angular position transmitter |
| 29 | Fuser device |
| 30 | Turner device |
| 31 | Arrows: Turning |
| 32 | Data transmission |

What is claimed is:

1. A method of adjusting devices (1, 1') for generating color separations (2, 2') in a multicolor printing machine (3), wherein changes in the dimensions (4, 4', 5, 5') of printing substrates (6) are taken into account by controlling image generation, comprising the steps of: registering the fiber orientation (7) of printing substrates (6); and on the basis of the fiber orientation (7) and values from experience (8, 8', 10, 10', 10"),of the behavior of printing substrates (6) depending on the fiber orientation (7), controlling image generation before the start of printing.

2. The method as claimed in claim 1, wherein values from experience (8) for various paper grades are stored, and the relevant values from experience (8) are taken into account.

3. The method as claimed in claim 1, wherein at least one paper property is registered, wherein values from experience (8') for the at least one paper property are stored, and wherein the relevant values from experience (8') are taken into account.

4. The method as claimed in claim 3, wherein such a paper property is the paper thickness.

5. The method as claimed in claim 3, wherein such a paper property is the paper weight.

6. The method as claimed in claim 1, wherein at least one condition (9, 9', 9") that causes the changes in the dimensions (4, 4', 5, 5') of printing substrates (6) is registered, and values from experience (10, 10', 10") associated with this condition (9, 9', 9") are taken into account in the control.

7. The method as claimed in claim 6, wherein such a condition is the atmospheric humidity (9').

8. The method as claimed in claim 6, wherein such a condition is the temperature (9").

9. The method as claimed in claim 1, wherein the control serves to achieve predefined dimensions (4', 5') of the finished prints.

10. The method as claimed in claim 1, wherein the control serves to coordinate the dimensions (4', 5') of recto (11) and verso print (12) with one another.

11. The method as claimed in claim 1, wherein the control serves to coordinate the dimensions (4', 5') of the prints of the various color separations (2, 2') with one another.

12. The method as claimed in claim 1, wherein values from experience (10, 10', 10") of conditions (9, 9', 9"), which bring about a change in the dimensions (4, 5, 4', 5') of printing substrates (6) after printing are taken into account.

13. The method as claimed in claim 12, wherein the values from experience (13) are dimensional changes (4, 5, 4', 5') resulting from further processing.

14. An apparatus having a control device (13) for adjusting devices (1, 1') for generating color separations (2, 2') in a multicolor printing machine (3), the control device (13) taking into account changes in the dimensions (4, 4', 5, 5') of printing substrates (6), comprising a sensor (15) for registering the fiber orientation (7) of printing substrate is arranged upstream of the first printing unit (14) of a multi-unit printing machine, wherein a store (16) is provided to accommodate values from experience (8, 8', 10, 10', 10") of the behavior of printing substrates (6) depending on the fiber orientation (7), and the control device (13) is to adjust the devices (1, 1') on the basis of the values from experience (8, 8', 10, 10', 10") before the start of printing, and is connected to the sensor (15) and store (16) for the purpose of data transmission (32).

15. The apparatus as claimed in claim 14, wherein the store (16) is loaded with values from experience (8) for various paper grades.

16. The apparatus as claimed in claim 14, wherein at least one sensor (17) register paper properties, wherein the memory (16) is loaded with values from experience (8') for various paper properties, and wherein the control device (13) is connected to the at least one sensor (17) for the purpose of data transmission (32).

17. The apparatus as claimed in claim 16, wherein the sensor (17) is a sensor for registering the paper thickness.

18. The apparatus as claimed in claim 16, wherein the sensor (17) is a sensor for registering the paper weight.

19. The apparatus as claimed in claim 14, wherein at least one sensor (18) register at least one condition (9, 9', 9") that causes the changes in the dimensions (4, 4', 5, 5') of printing substrates, wherein the store (16) is loaded with values from experience (10, 10', 10") for the at least one condition (9, 9', 9"), and wherein the control device (13) is connected to the at least one sensor (18) for the purpose of data transmission (32).

20. The apparatus as claimed in claim 19, wherein the at least one sensor (18) is a sensor for registering the atmospheric humidity.

21. The apparatus as claimed in claim 19 or 20, wherein the at least one sensor (18) is a temperature sensor.

22. The apparatus as claimed in claim 14, wherein the control device (13) is such that it takes into account the changes in the dimensions (4, 4', 5, 5') in such a way that predefined dimensions (4', 5') can be achieved in the finished prints.

23. The apparatus as claimed in claim 14, wherein the control device (13) is such that it takes into account the changes in the dimensions (4, 4', 5, 5') such that the dimensions (4', 5') of recto (11) and verso print (12) are coordinated with one another.

24. The apparatus as claimed in claim 14, wherein the control device (13) is such that it takes into account the changes in the dimensions (4, 4', 5, 5') such that the dimensions (4', 5') of the prints of the various color separations (2, 2') are coordinated with one another.

25. The apparatus as claimed in claim 14, wherein the memory (16) is loaded with values from experience (10, 10', 10") which relate to conditions (9, 9', 9") which act on a printing substrate after the printing, and wherein the control device (13) is such that it takes into account the values from experience (10, 10', 10") when controlling the image generation in order to achieve predetermined dimensions (4', 5') of the finished product.

* * * * *